United States Patent [19]

Burgess

[11] 3,717,514

[45] Feb. 20, 1973

[54] SINGLE CRYSTAL SILICON CONTACT FOR INTEGRATED CIRCUITS AND METHOD FOR MAKING SAME

[75] Inventor: Ronald R. Burgess, Phoenix, Ariz.

[73] Assignee: Motorola, Inc., Franklin Park, Ill.

[22] Filed: Oct. 6, 1970

[21] Appl. No.: 78,468

[52] U.S. Cl. ..................148/175, 148/187, 148/188, 156/17, 317/234 M, 317/235 W

[51] Int. Cl. ..............................................H01l 7/36

[58] Field of Search........148/188, 189, 175; 317/235 WW, 317/235; 156/17

[56] References Cited

UNITED STATES PATENTS

| | | | |
|---|---|---|---|
| 3,189,973 | 6/1965 | Edwards et al. | 29/25.3 |
| 3,234,058 | 2/1966 | Marinace | 148/175 |
| 3,375,417 | 3/1968 | Hull, Jr. et al. | 317/234 |
| 3,477,886 | 11/1969 | Ehlenberger | 148/187 |
| 3,490,964 | 1/1970 | Wheeler | 148/187 |
| 3,502,517 | 3/1970 | Sussman | 148/175 |
| 3,514,845 | 6/1970 | Legat et al. | 148/175 UX |

*Primary Examiner*—L. Dewayne Rutledge
*Assistant Examiner*—J. M. Davis
*Attorney*—Mueller, Aichele & Gillman

[57] ABSTRACT

The method for making a single crystal silicon contact for integrated circuits is described. The epitaxial contact is self-patterning and is formed by coherent growth on a surface of monocrystalline silicon for protecting and contacting said surface.

15 Claims, 4 Drawing Figures

INVENTOR.
Ronald R. Burgess
BY
Mueller & Aichele
ATTORNEYS

SINGLE CRYSTAL SILICON CONTACT FOR INTEGRATED CIRCUITS AND METHOD FOR MAKING SAME

BACKGROUND OF THE INVENTION

The essential ingredient of a wash out emitter structure involves the cutting of the emitter diffusion window. This aperture is normally of a very fine opening, as small as one tenth of a mil or smaller, otherwise the technique would not be applied. Following the opening of the emitter diffusion aperture, the actual emitter diffusion is performed which includes the growing of a small amount of oxide covering the emitter aperture. The thickness of this oxide normally is in the range of 100 to 500 angstroms, always less than 1000 angstroms. Following the diffusion, the base preohmic or base contact windows are opened with conventional techniques. Then, the actual wash out of the emitter oxide takes place. This means the entire wafer is immersed in an etch without the benefit of any photoresist or photolithographic techniques for removing the small amount of oxide that was grown in the emitter window during diffusion. Following this wash out, a metal layer is applied in a conventional manner to the structure to form the contacts. The above described process is improved by arranging a passivating plug of epitaxially grown single crystal silicon in the emitter window and diffusing through the epitaxial silicon layer. In this manner, the advantages of the emitter wash out technique are retained.

Additionally, in the design of a high frequency transistor, it is oftentimes desirable to divide the emitter area into as many narrow fingers as possible. The optimum width of these fingers is often the finest line width that can be photoresisted. No provision is made for a preohmic cut. During emitter diffusion, oxide growth over the emitter aperture is discouraged. However, a small amount does grow in this area during the emitter diffusion. This oxide is washed off with a short dip in a hydrofluoric acid bearing etch. During this process only the lateral diffusion of the emitter junction under the masking oxide is utilized to insure junction passivation. Since this emitter diffusion is typically 2500 angstroms deep, this lateral penetration is usually very small, and the yield of good junctions is quite low. In addition, such a junction is easily eroded by the reaction of aluminum and silicon at a relatively low temperature if aluminum metallization is used. Since such a high frequency transistor comprises one to a hundred or more of these emitter fingers in parallel, fabrication of such devices is difficult by using prior art techniques.

SUMMARY OF THE INVENTION

The present invention relates to single crystal silicon contacts for integrated circuits and, more particularly, to the formation of such contacts by epitaxially growing self-aligning contacts.

It is an object of the present invention to provide an improved method and means for passivating the base-emitter junction of a small geometry transistor.

It is another object of the present invention to provide a self-aligning emitter contact.

It is a further object of the present invention to provide a single crystal silicon element through which the emitter region of a small geometry transistor is fabricated and after such formation, the element is employed for contacting the emitter region.

These and other objects and features of this invention will become fully apparent in the following description of the accompanying drawings, wherein.

BRIEF DESCRIPTION OF THE INVENTION

The present invention features the formation of a single crystal silicon plug in the emitter diffusion aperture by epitaxial deposition. The epitaxial plug is self-patterning or in other terms, self-aligning. Thus, one photoresist step is eliminated. The epitaxial deposition is carried out at a temperature below that at which the previously performed base diffusion is perturbed. Some base movement occurs at 900°C. Accordingly, a useful range for the epitaxial deposition is 500° to 850°C.

DETAILED DESCRIPTION OF THE DRAWINGS

Figure 1:
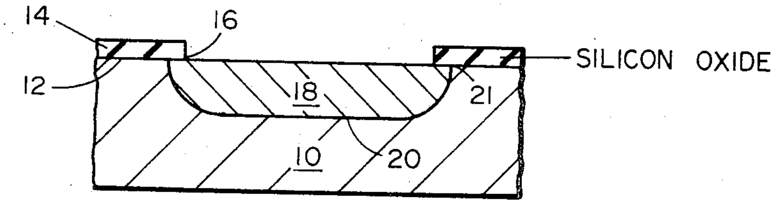
FIG. 1 shows the formation of a base region by well known techniques.

Referring to FIG. 1, there is shown a body 10 of semiconductor material of one conductivity type, such as P type, having at least an upper surface 12 upon which a masking layer 14 is formed having an opening 16 made therein according to standard photoresist techniques. Since the block of the body 10 of semiconductor material is shown as being of P conductivity type, a material such as phosphorous, is diffused through the opening 16 under standard procedures for forming an N diffusion area 18 characterized by a PN junction 20 having an edge 21 intersecting the surface 12 under the silicon dioxide layer 14. The body of semiconductor material 10 represents either the starting substrate normally employed in the fabrication of semiconductor products or is an epitaxially formed layer employed in the formation of integrated circuits or discrete devices.

The diffused region 18 represents the base region of a transistor in particular but in general it represents a diffused region of a first conductivity type within a semiconductor body of an opposite conductivity type.

Figure 2:
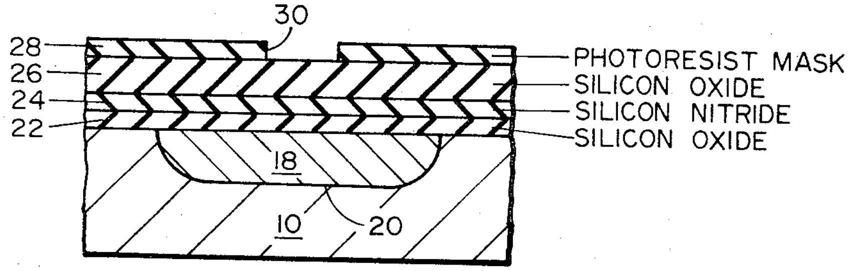
FIG. 2 shows the formation of a silicon nitride layer as an etch limiting member and a relatively thick layer of silicon dioxide formed thereupon.

The silicon dioxide layer 14 is removed by standard etching techniques and a fresh passivating layer 22 of silicon dioxide or other equivalent material formed as shown in FIG. 2. The silicon dioxide layer 22 covers the entire upper surface 12 of a semiconductor body 10 including the base region 18. The silicon dioxide layer 22, as previously mentioned, could be a newly formed layer replacing the layer 14 or could include the silicon dioxide formed during the base diffusion. A nitride layer 24 is formed over the silicon dioxide layer 22 and is conveniently made approximately 1,000 angstroms thick. A relatively thick layer of silicon dioxide, 26, is formed over the silicon nitride layer 24. This layer is preferably one micron or so in thickness. This relatively thick layer of silicon dioxide is required for setting up the differential etch. More specifically, the etching will continue through the silicon dioxide layer but stop at the underlying silicon nitride layer. A photoresist mask 28 is formed over the relatively thick layer of silicon dioxide and is provided with an aperture 30 located in spacial relationship with the base region or region of opposite conductivity type 18. By using standard etching procedures, an aperture is formed cutting through the silicon dioxide layer 26, the silicon nitride layer 24 and the lower silicon dioxide layer 22 exposing an upper portion 32 of the base region 18.

Figure 3:
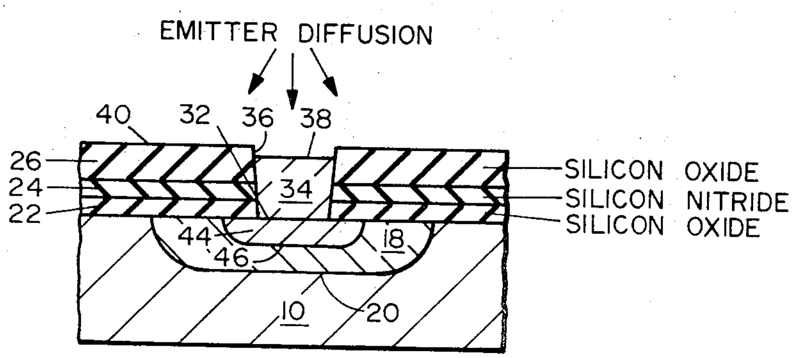
FIG. 3 shows the opening of the emitter aperture and the formation of the single crystal silicon element.

Referring to FIG. 3, this upper portion 32 is shown in registration with the aperture 30. Because of the thickness of the silicon nitride layer 24 and the silicon dioxide layer 26, the conventional photolithographic technique produces an aperture which has sloping sides as illustrated in FIG. 3. Following this cut through the silicon nitride and silicon dioxide layers 24 and 26 respectively, down to the single crystal substrate 10, the wafer is placed in an epitaxial reactor and a low temperature epitaxial plug 34 is grown. It should be noted that this plug is grown to a thickness slightly less than the total thickness of the oxide-nitride-oxide sandwich, layers 22, 24 and 26, as indicated by the spacial relationship indicated at 36 between the top 38 of the plug 34 and the upper surface 40 of the relatively thick silicon dioxide layer 26. The single crystal silicon plug 34 is formed coherently in intimate integral relationship with the surface 32 of the base region 18 and is so formed in integral coherent fashion to slightly below the upper surface 40 of the silicon dioxide layer. The polycrystalline silicon formed on top of the surface 40 forms a layer, not shown, having an incoherent crystal structure and does not form intimate or integral connection with the surface 40. The stopping of the coherent growth of the plug 34 below the surface 40 is required so that the polycrystalline silicon which is deposited on the upper surface 40 does not form a coherent layer. Because of the control exercised over this low temperature deposition, the deposition rates are known and the deposition thickness can be stopped before the plug 34 reaches the surface 40.

The composite structure shown in FIG. 3 is immersed in an oxide etch such as a hydrofluoric acid solution. The etch penetrates the incoherent polycrystalline layer atop the surface 40 and attacks and removes the thick silicon dioxide layer 26 located thereunder. As this thick oxide layer is removed, it removes with it the incoherent polycrystalline silicon layer formed thereupon. When the etch has completely removed the silicon dioxide layer 26 underlying the polycrystalline silicon layer the etch reaches the silicon nitride layer 22 where it is ineffective and the etching action stops.

Figure 4:
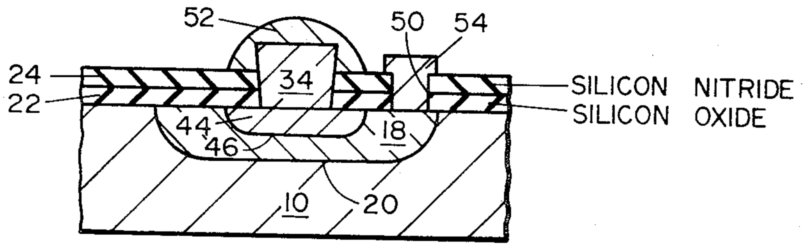
FIG. 4 shows the application of a metallic layer to the single crystal element.

Referring to FIG. 4, there is shown the resulting composite structure including the silicon body 10 having a base region 18 formed therein. An emitter region 44 is formed therein by diffusion through the single crystal silicon element 34 having a junction 46 extending to the surface 12. Surface passivation is provided by the layers of silicon dioxide 22 and silicon nitride 24. At no time after the formation of the base emitter junction 46 has that junction been exposed to any possible source of contamination. During its formation the single crystal plug 34 is in position and no source of contaminants is available for introducing such contaminants into the emitter region. The silicon nitride layer 24 masks the base region against the emitter diffusion. Following the emitter diffusion, the base contact region is opened through the nitride layer 24 and the silicon dioxide layer 22 by conventional photolithographic techniques and the base contact opening is established as shown at 50. Metal is then formed over the entire upper structure and selectively removed leaving the emitter contact 52 and the base contact 54. The collector contact can be conveniently provided at the back of the device if a discrete component is formed or a collector contact can be formed on the upper surface of the device similar to that formed for contacting the base when an integrated circuit is fabricated. An added feature of the silicon dioxide-silicon-nitride layers is that the silicon nitride layer on the surface of the device gives it increased protection against ionic contaminants since nitride being a more refractory substance than silicon dioxide has a much lower diffusion coefficient for sodium, lithium, and other contaminating species. It need not be removed and in fact there is an advantage for retaining it on the surface of the structure. While the above description has been applied in the instance of a single crystal silicon element employed for first forming and then contacting the emitter region thereafter formed in a transistor, it should be noted that the concept described herein is widely employable for providing a region of one conductivity material in an already formed opposite conductivity type region and thereafter protecting the junction formed between the two regions. One specific application for using the present invention is in the design and manufacture of high frequency transistors where it is important to divide the emitter area into as many narrow fingers as possible. The optimum width of these fingers is usually the finest line width that can be photoresisted. No provision is made for a preohmic cut. The growth of monocrystalline silicon over the emitter aperture followed by the selective removal of the relatively thick oxide layer leaving the emitter geometry covered by the single crystal silicon element has resulted in the self-alignment of the single crystal silicon plug over the emitter window. A subsequent diffusion through the single crystal silicon plug establishes the emitter within the underlying base region. Then since the single crystal silicon element is not removed it continues to protect the base emitter junction formed just previously during the emitter diffusion. When metal is applied over the monocrystalline silicon element, no metal is capable of reaching and contaminating the base emitter junction. Normally, during the diffusion of an emitter, or other region, an oxide layer forms on the region. Generally, before the region is contacted by metal, the region is etched to clean the surface of the oxide and other contaminants. In shallow junction devices, this pre-metal etch sometimes penetrates the surface layer passivating the emitter-base junction and the often deposited layer of metal shorts the junction and effectively renders the device unfit for its intended function. Using the present invention, the single crystal plug protects the emitter-base junction against exposure of the base-emitter junction by eliminating a pre-metal etch and by protecting the emitter-base junction against possible erosion by aluminum often used as the metal.

While the invention has been particularly shown and described with reference to a preferred embodiment thereof, it will be understood by those skilled in the art that other changes in form and detail may be made therein without departing from the spirit and scope of the invention.

What is claimed is:

1. In the fabrication of semiconductor devices, a process for the making of diffusions in a semiconductor body employing a self aligning member for defining the region to be diffused, comprising the steps of:

providing a body of silicon semiconductor material having a first surface and being of one conductivity type material;

forming a first mask on said first surface and providing a first aperture therethrough for exposing a portion of said first surface;

forming a first region of opposite conductivity type within said body by passing a conductivity type determining impurity through said aperture, and said first region having a second surface coplanar with said first surface;

forming a diffusion mask on said first surface and said second surface and providing a second aperture therethrough for exposing a selected portion of said second surface, and said second diffusion mask having an upper surface;

forming a single crystal silicon plug adherent to said second surface exposed by said second aperture and positioned wholly within said aperture, and having a top surface which is positioned below the upper surface;

removing a portion of said second mask for preparing said remaining structure for further processing such that said top surface of said single crystal plug is now positioned above the upper surface of the second diffusion mask;

passing an impurity through said plug and into said first region to form a second region within said first region, said second region being opposite in conductivity to said first region, selectively removing a portion of said second mask, remaining after said last step, which portion is overlying said first region for exposing a second portion of said second surface; and forming separate metal electrodes adherent to said plug and said second portion of said second surface.

2. The process defined in claim 1 which further includes:

forming a plurality of apertures in said first mask, and passing an impurity of said opposite conductivity type through said plurality of apertures for alternately forming isolation region and region of said opposite con-ductivity type on said body.

3. The process defined in claim 1 wherein the formation of said second mask comprises the steps of:

forming a first layer of silicon oxide on said semiconductor body;

forming a silicon nitride layer on said first layer; and forming a second layer of silicon oxide on said nitride layer to a thickness for determining the size of said plug.

4. The process defined in claim 1 wherein the removal of a portion of said mask comprises the step of:

removing said second layer for cleaning said plug and for preparing it for contact with said metal electrode.

5. A process defined in claim 1 wherein said first layer of silicon oxide is approximately 2500 angstroms thick:

said silicon nitride layer is approximately 1000 angstroms thick; and said second layer of silicon oxide is approximately 10,000 angstroms thick.

6. In the fabrication of semiconductor devices, a process for the making of diffusions, in a semiconductor body, employing a self aligning member as the means for defining the region to be diffused, comprising the steps of:

providing a body of semiconductor material having a first surface and being of one conductivity type material;

forming a diffusion mask on said first surface and providing an aperture therethrough for exposing a portion of said first surface, and said diffusion mask having an upper surface;

forming a single crystal silicon plug adherent to said first surface exposed by said aperture and positioned wholly within said aperture, and having a top surface which is positioned below the upper surface of said diffusion mask;

diffusing opposite type conductivity determining impurities through said plug for forming a region of opposite type conductivity having a junction with said body and extending to said first surface under said diffusion mask;

removing a portion of said mask for preparing said plug for further processing such that said top surface of said single crystal plug is now positioned above the upper surface of the diffusion mask; and forming a metal electrode adherent to said plug for making electrical contact to said region.

7. The process as defined in claim 6 wherein the formation of said mask comprises the steps of:

forming a first layer of an oxide of said semiconductor body;

forming a silicon nitride layer on said first layer; and forming a second layer of an oxide on said nitride layer to a thickness for determining the size of said plug.

8. The process as defined in claim 6 wherein the removal of a portion of said mask comprises the steps of:

removing said second layer for cleaning said plug and for preparing it for contact with said metal electrode.

9. In the fabrication of semiconductor devices, a process for the making of diffusions in a semiconductor body employing a self aligning member as the means for defining the region to be diffused, comprising the steps of:

providing a body of semiconductor material having a first surface and being of one conductivity type material;

forming a first mask on said first surface and providing a first aperture therethrough for exposing a portion of said first surface;

forming a first region of opposite conductivity type within said body by passing a conductivity type determining impurity through said aperture, and said first region having a surface coplanar with said first surface;

forming a second diffusion mask on said first surface and said second surface and providing a second aperture therethrough for exposing a selected portion of said second surface, and said second diffusion mask having an upper surface;

forming a single crystal plug adherent to said second surface exposed by said second aperture and positioned wholly within said aperture, and having a top surface which is positioned below the upper surface of said diffusion mask;

removing a portion of said second mask for preparing said remaining structure for forther processing such that said top surface of said single crystal plug is now positioned above the upper surface of the second diffusion mask;

passing an impurity through said plug and into said first region to form a second region within said first region, said second region being opposite in conductivity to said first region; and forming a metal electrode adherent to said plug for making electrical contact to said second region.

10. The process defined in claim 9 which further includes:

forming a plurality of apertures in said first mask, and passing an impurity of said opposite conductivity type through said plurality of apertures for alternately forming isolation regions and regions of said opposite conductivity type on said body.

11. The process defined in claim 9 wherein the formation of said second mask comprises the steps of:

forming a first layer of an oxide on said semiconductor body;

forming a silicon nitride layer on said first layer; and forming a second layer of an oxide on said nitride layer to a thickness for determining the size of said plug.

12. The process defined in claim 9 wherein the removal of a portion of said mask comprises the step of:

removing said second layer for cleaning said plug and for preparing it for contact with said metal electrode.

13. The process as defined in claim 9 wherein the formation of said mask comprises the steps of:

forming a first layer of an oxide of said semiconductor body;

forming a silicon nitride layer on said first layer; and forming a second layer of an oxide on said nitride layer to a thickness for determining the size of said plug.

14. The process as defined in claim 9 wherein the removal of a portion of said mask comprises the steps of:

removing said second oxide layer for cleaning said plug and for preparing it for contact with said metal electrode.

15. In the fabrication of semiconductor devices, a process for the making of diffusions in a semiconductor body employing a self aligning member for defining the region to be diffused, comprising the steps of:

providing a body of silicon semiconductor material having a first surface and being of one conductivity type material;

forming a diffusion mask on said first surface and providing an aperture therethrough for exposing a selected portion of said second surface, and said diffusion mask having an upper surface;

forming a single crystal silicon plug adherent to said second surface exposed by said second aperture and positioned wholly within said aperture, and having a top surface which is positioned below the upper surface;

removing a portion of said second mask for preparing said remaining structure for further processing such that said top surface of said single crystal plug is now positioned above the upper surface of the second diffusion mask;

diffusing opposite type conductivity determining impurities through said plug for forming a region of opposite type conductivity having a junction with said body and extending to said first surface under said diffusion mask; and forming a metal electrode adherent to said plug for making electrical contact to said region.

* * * * *